United States Patent Office 2,958,783
Patented Nov. 1, 1960

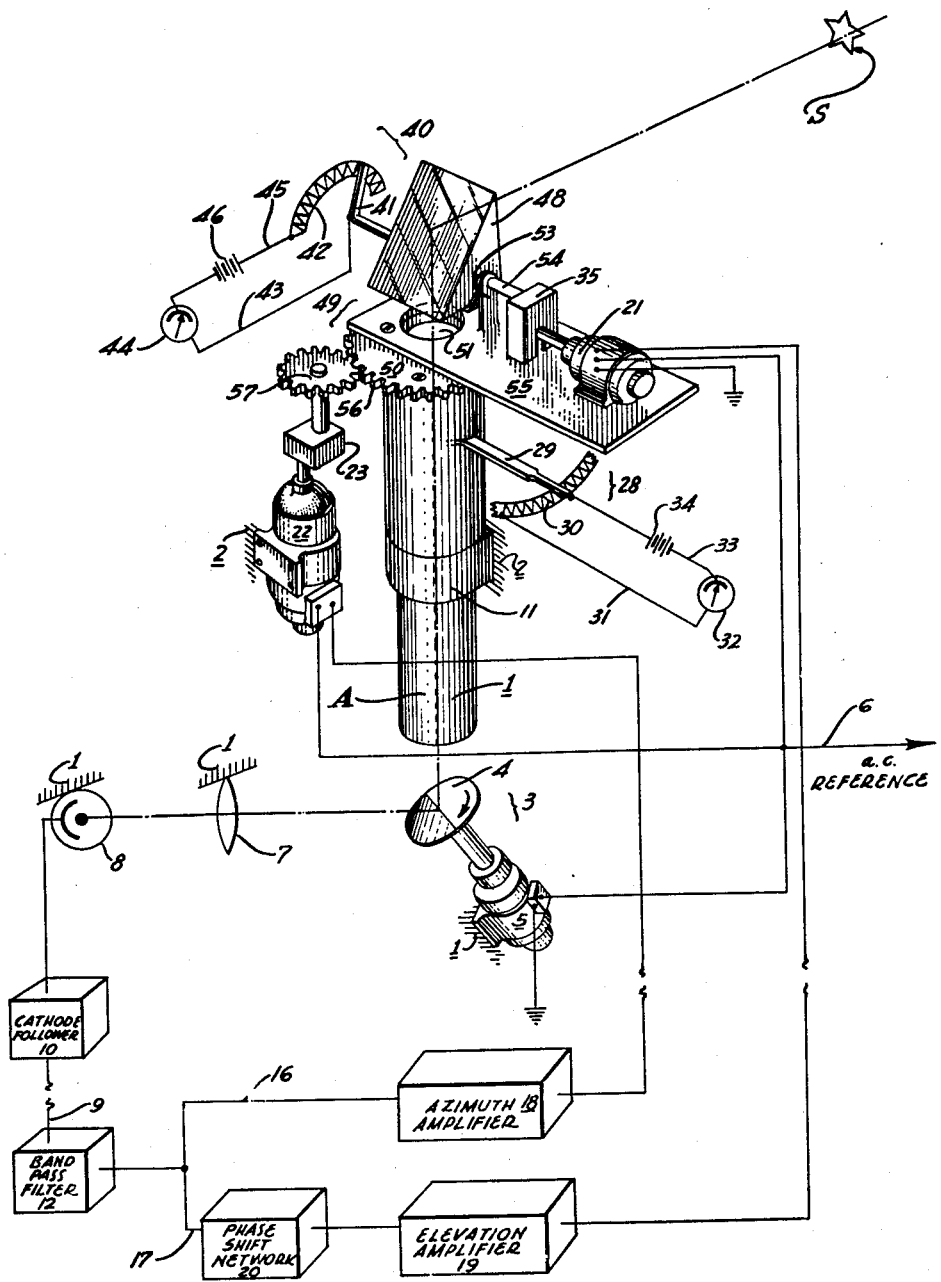

2,958,783
SCANNER

Philip H. Taylor, Los Angeles, Calif., assignor to Northrop Corporation, Hawthorne, Calif., a corporation of California Filed Mar. 14, 1949, Ser. No. 81,225

2 Claims. (Cl. 250—203)

This invention relates to star tracking systems, and more particularly to automatic star tracking employing a novel means and method of error detecting.

Star tracking systems are desirable for automatically establishing star lines of sight in such a manner that a usable intelligence can be derived consisting of the measured or tracked star elevation with respect to some known reference plane established at the tracking means; and the measured or tracked star azimuth as indicated by the relation of the line of bearing of the star in the reference plane with respect to some known reference such as the direction of magnetic north.

This intelligence is thus useful for establishing a relationship in space between the tracking means and the selected star as a part of essential information required to perform automatic celestial navigation, or in any other manner where an instantaneous or continual reference to one of the heavenly bodies is required.

The tracking of a star in two coordinates, namely azimuth and elevation, requires that two error signals must be sensed by a scanner, or detector, in order to return the star image to a null position on the scanner.

Instead of providing two focal image planes and two detectors, each properly aligned in the optical system of the tracker, to determine two-coordinate error-sensing, it is highly desirable to have a single error-signal scanning means and method whose single signal output can be adapted to determine both the azimuth and elevation error. When properly designed, such an error scanner leads to a lighter, more compact, more reliable, easier to align unit which is admirably suited for aircraft use.

It is therefore an object of the present invention to provide a novel scanning means and method of modulating a single error signal into useful periodic signals.

It is another object of the invention to provide a novel means and method of scanning a single error signal to provide the basis for obtaining a two coordinate signal error.

It is still another object of the present invention to provide a novel means and method of forming signals indicative of the direction of deviation of an image of a star from the center of the field of view of the optical system.

In broad terms, the light of a star is received by the objective of a telescope and is focused onto a partially reflective rotary light chopper of such a design that the deviation of the image from the center of the chopper is intermittently reflected into pulses of light, thus modulating the image into light pulses recurring at a reference frequency that is identical to chopper rotation. Means can then be provided to translate these light pulses into usable servo signals to be used by suitable driving means to reorient the optical system so as to return the star lines to coincidence with the optical axis.

The above and other objects and advantages of the present invention will be more apparent from the ensuing description of a star tracking system utilizing the preferred embodiment of the invention.

In the drawing, a telescope 1 is mounted on the gyro-stabilized platform 2 with its optical axis preferably fixed normal to the platform 2. The telescope 1, however, is free to rotate in bearing 11 about its optical axis. A total reflecting prism 48, e.g., a prism with two 35° angles and mirrored on its back side is mounted on the upper end of telescope 1 on mount 49.

The parallel light beams from an interesting star S are picked up by prism 48, reflected vertically, and received by the objective of the telescope 1 which focuses the image of the star S onto a rotary light chopper 3 rigidly connected to move with the body of the telescope 1.

Mount 49 for the prism 48 is comprised of a horizontal circular ring 50 and a platform 55 with a hole 51 cut therethrough concentric with the optical axis of the telescope 1 to permit the beam from the star S to pass through. Circular ring 50 and platform 55 are rigidly connected to the top of telescope 1 to rotate therewith. Vertical uprights 53 on platform 55 form a bracket for supporting the prism 48, above hole 51, on trunnions 54 which rotate the prism 48 about its horizontal elevation axis. Elevation servo motor 21 and elevation gear box 35, mounted on platform 55, are provided to rotate prism 48 by driving through trunnion 54.

For tracking the star in azimuth, circular ring 50 has teeth 56 on the periphery thereof which mesh with an azimuth gear 57 driven by azimuth servo motor 22 through azimuth gear box 23. Thus, the mounting 49, prism 48, and telescope 1 are driven in azimuth as a single, easily balanced, unit about the optical axis of telescope 1.

Rotary light chopper 3, consists of a glass disc 4 driven by a synchronous motor 5 off reference frequency line 6. Glass disc 4 is positioned with its plane at 45° to the tracking axis of the telescope and with the center of the disc 4 intersected by the tracking axis thereof. One half of the plane of the disc 4 is transparent; the other half is aluminized. The rotating glass disc 4 thus modulates any deviation of the image from the center thereof into light pulses. These light pulses are reflected from the aluminized half of disc 4 and then passed through a collimator lens 7. The purpose of the collimator lens 7 is to direct the light pulses onto the same area of the cathode of a photo-multiplier tube 8 to provide a consistent photocell output. The lens 7 and tube 8 are likewise mounted to move with the body of telescope 1.

The photocell 8 output is a feeble high impedance signal which is fed directly into a cathode follower 10 whose output is a low impedance, amplified signal with the same characteristics of the original photocell signal. This arrangement reduces the electrostatic and electromagnetic effects due to the circuits in the vicinity to inconsequence and furthermore makes it possible to convey the electrical signal through a cable 9 of substantial length, thus enabling the remaining components of the system to be located at some isolated area so that the entire mass of the system need not be swung by the servo motors. The power amplifying circuit consists of two parallel channel loads, the azimuth and elevation channel leads 16 and 17, respectively, containing therein azimuth and elevation amplifiers 18 and 19, respectively. As the signal enters the power amplifier circuit it passes through a 50–60 c.p.s. band pass filter 12 which eliminates spurious and undesirable frequencies. In passing into elevation amplifier 19 the signal is subjected to a phase displacement by a phase shift network 20 such that the elevation channel power signal is displaced from the azimuth channel power signal by 90 electrical degrees. The output signals from the elevation and azimuth amplifiers appear as two-phase displaced power signals to elevation and azimuth servo motors 21 and 22, respectively. These motors are two-phase balancing motors in which the above signal voltages are impressed on one field, referred to as the control field, and line reference voltage from reference line 6 is impressed on the second field, referred to as the reference field.

A means for indicating the azimuth angle of the tracked star with respect to a given reference direction, such as magnetic north, is provided by a potentiometer device 28, only a portion of which is shown, having a contact arm 29 which is rigidly attached to telescope 1 and adapted for movement therewith. The contact arm 29 is slidable over resistance 30, one extremity of which is connected by lead 31 to an azimuth ammeter 32 which may be calibrated as a function of telescope azimuth. The contact arm 29 is also connected to azimuth ammeter 32 by lead 33, there being a source of electric energy 34 in the last mentioned lead.

The elevation indicating arrangement for the telescope, which records the tracked star elevation angle with respect to the plane of the gyro-stabilized platform 2, is obtained by means of a second potentiometer device 40 analogous to the one previously described. Arm 41, rigidly connected to rotate with prism trunnion 54, is slidable over a potentiometer resistance 42. Lead 43 connects the arm 41 to elevation ammeter 44. Lead 45 connects one end of the resistance to the elevation ammeter 44, there being a source of electrical power 46 in the latter lead.

This completes the description of a preferred embodiment of the invention showing a means and method of tracking a star by use of a novel, non-interferring error detecting scanner.

The torque characteristics of the two-phase drive motors used in the tracking system vary as a function of the phase relation of the voltages impressed on their fields. When the alternating voltages impressed on their reference and control fields respectively become 90 or 270 electrical degrees out of phase, the torque on their rotor in both instances reaches a maximum, but in opposite direction; and when 0 or 180 electrical degrees out of phase, the torque becomes zero.

By connecting the reference fields of the drive motors to the same reference frequency controlling the synchronous motor driving the rotary chopper, a fixed relationship is established for the output signal frequency, which has a phase characteristic determined by the direction of the image deviation from null, so that when impressed on the control fields of the motors, the motors are actuated in accordance with the phase relationship of the fields and in such a manner as to return the image to null.

The fixed azimuth and elevation null axes in the fixed plane in which the glass disc rotates correspond to the diameters therein determined by the trace of the image formed by swinging the telescope, or prism, as the case may be, from the null position at the center of the glass disc, about each of its mounting axes.

The half aluminized disc must be properly oriented in this fixed azimuth and elevation coordinate axes so that, for instance, the diameter formed by the edge of the aluminized area of the disc coincides with the azimuth null axis at the instant of 0 electrical degrees of the reference voltage.

Assume, for example, that the tracking system maintains its correct azimuth angle but deviates from the desired elevation angle. The error signal for this case, which is at the same frequency as the reference frequency and is substantially a 180 degree positive portion of a sine wave neglecting the higher frequencies, is such that it is either in phase with or 180 electrical degrees out of phase with the azimuth motor reference frequency and this condition as explained above, causes no rotation in that motor. However, this same error signal when shifted through 90 electrical degrees in the elevation channel lead is made to be 90 or 270 electrical degrees out of phase with the elevation motor reference frequency and in such a manner as to rotate the elevation motor to cause the tracking system to null on the elevation axis.

Thus, the phase relationship between the light pulses and the A.C. supply line used as a reference indicates the direction of the star image from the center of the rotary scanner. This phase relationship, furthermore, is utilized as has been described, in a suitable null-seeking servo system to control the telescope to follow the interested star.

It should be distinctly understood that the half transparent, half reflective rotary scanner used herein could be used with other optical means and other servo control circuits. The apparatus for accomplishing these results being shown and described herein by way of illustration and not limitation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its form or modifications within the legitimate and valid scope of the appended claims.

What is claimed is:

1. A star tracker comprising an optical means for focusing the image of an interesting star, a scanner disc positioned in the focal plane of said optical means with its center intersected by the optical axis thereof, the plane of said scanner disc being diametrically divided into non-reflective and reflective areas, an A.C. reference frequency supply, a motor for rotating said scanner at said reference frequency, said scanner chopping light caused by any deviation of said image from the center thereof, light responsive means positioned to translate said chopped light into usable periodic signals at said reference frequency, said optical means including a reflecting means positioned to reflect incident rays from said star into alignment with said optical axis, means rotatably mounting said reflecting means about said optical axis in an azimuthal direction, additional means also rotatably mounting said reflecting means about an axis perpendicular to said optical axis for rotation in an elevation direction, electrically operated elevation driving means connected to rotate said reflecting means about said perpendicular axis, said elevation driving means being integrally mounted to rotate with said reflecting means about said optical axis, electrically operated azimuth driving means connected to rotate said reflecting means and said elevation driving means about said optical axis, and means for energizing both said driving means to make said optical means follow said star in azimuth and elevation in accordance with said periodic signals and said reference frequency, said energizing means being positioned separately from and not rotating with the structure of said optical means.

2. Apparatus in accordance with claim 1 wherein the diameter formed by the edge of the reflective half of said scanner disc is oriented to coincide with the azimuth null axis at the instant of 0° electrical degrees of said reference frequency.

References Cited in the file of this patent

UNITED STATES PATENTS

| | | |
|---|---|---|
| 1,816,047 | Keuffel | July 28, 1931 |
| 2,462,925 | Varian | Mar. 1, 1949 |
| 2,513,367 | Scott | July 4, 1950 |

FOREIGN PATENTS

| | | |
|---|---|---|
| 33,746 | Netherlands | Nov. 25, 1930 |